S. Yates,

Churn Dasher.

No. 83,015. Patented Oct. 13, 1868.

Witnesses;
J. W. Burris
David A. Burr

Inventor;
Samuel Yates
by G. B. Powles
Attorney

SAMUEL YATES, OF MARSHALL, MISSOURI.

Letters Patent No. 83,015, dated October 13, 1868.

IMPROVEMENT IN CHURN-DASHERS.

The Schedule referred to in these Letters Patent and making part of the same.

*To all whom it may concern:*

Be it known that I, SAMUEL YATES, of Marshall, in the county of Saline, and State of Missouri, have invented a new and useful Improvement in Churn-Dashers; and I do hereby declare that the following is a full, clear, and exact description of the construction and operation of the same, reference being had to the accompanying drawings, making a part of these specifications, in which—

Like letters in the two figures of the drawings indicate like parts.

Nature.

My invention consists of a hollow or tubular churn-dasher shaft, provided with an air-chamber at the lower end thereof, having a valve opening downward, in combination with a concave perforated dasher, and air-tubes on the top of the dasher connecting with the air-chamber, and through which tubes air is conducted down into the cream.

Construction.

A represents a hollow shaft, provided with an air-chamber, B, at the lower end of the shaft, the air-chamber being larger in diameter, about one-half larger, that is, as one and a half is to one, ($1\frac{1}{2}$ : 1,) than the shaft.

C is a valve, at the upper part of the air-chamber, arranged to open downward, and resting on an open valve-seat, $a$.

D is a concave dasher, with perforations $c\ c\ c\ c$.

Figure 1:
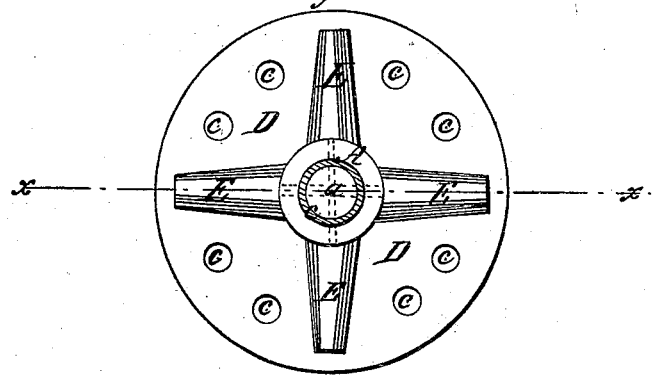
Figure 1 is a top view.

E E E are air-tubes, on the top of the dasher, connected at the upper ends with the shaft A, for conducting the air from the air-chamber down into the cream. The upper part of the dasher D is joined air-tight to the lower end of the air-chamber B, so that the air may be forced through the tubes E. The dotted lines in fig. 1 indicate the open valve-seat.

Operation.

As the dasher is plunged into the cream, the valve is forced up, closing the hollow shaft, and the air is forced from the air-chamber, through the tubes E, down into the cream. The upward motion of the dasher opens the valve downward, allowing the air-chamber to fill again with air, which, by the downward motion, is forced as before into the cream. Thus currents of air are being constantly pumped through the cream, and by actual experiment with a dasher thus constructed, butter has been produced in three minutes.

Figure 2:
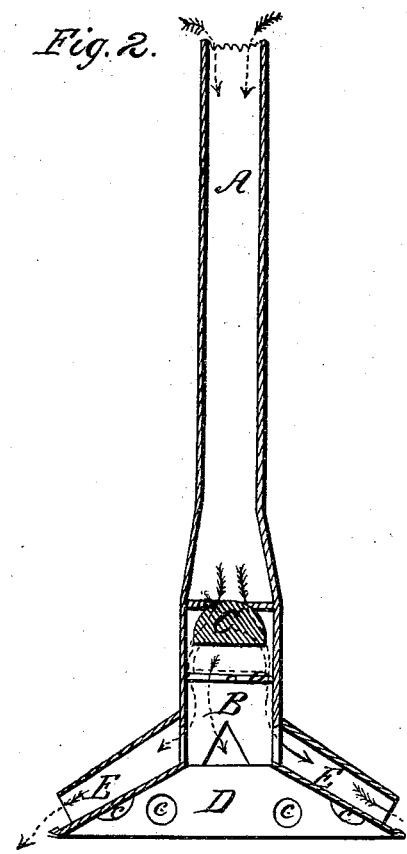
Figure 2 is a central vertical section of the same, as indicated by line $x\ x$ in fig. 1.

The red arrows in fig. 2 clearly indicate the direction of the air, through the shaft and valve, into the chamber, and from the chamber through the tubes into the cream.

Claims.

Having thus fully described my invention,

What I claim therein as new, and desire to secure by Letters Patent, is—

The combination of the hollow or tubular shaft A with air-chamber B, valve C, dasher D, and air-tubes E, as constructed and arranged, substantially in the manner and for the purpose described.

SAMUEL YATES.

Witnesses:
H. C. FINCH,
D. MEGUILLET.